Nov. 30, 1943.        J. W. BEECHER        2,335,633
RECORDING MEANS
Filed May 7, 1942
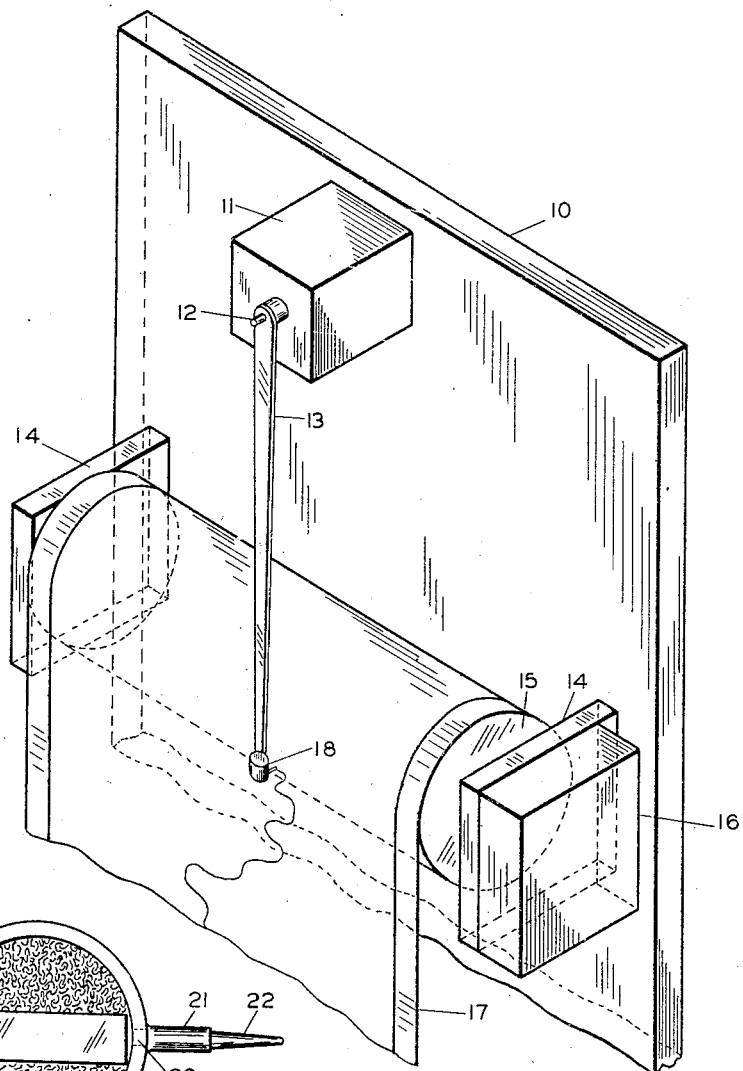
FIG. 1
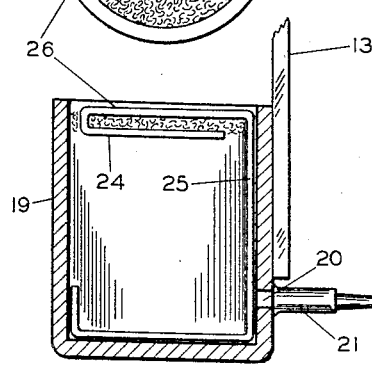
FIG. 3
FIG. 2
INVENTOR.
John Winfred Beecher
BY E. C. Sanborn
Attorney Patented Nov. 30, 1943

2,335,633

UNITED STATES PATENT OFFICE 2,335,633

RECORDING MEANS

John Winfred Beecher, Waterbury, Conn., assignor to The Bristol Company, Waterbury, Conn., a corporation of Connecticut Application May 7, 1942, Serial No. 442,040

6 Claims. (Cl. 120—43)

This invention relates to pens for recording instruments, and more especially to the so-called "fountain" pens intended to contain a small quantity of liquid ink and to provide a continuous record extending over a more or less extended period of time.

In recording instruments of the direct marking type, it is customary to provide a pen of sufficiently small size that its weight may have a negligible effect upon the readings of the instrument, and yet of capacity to contain sufficient ink to provide a continuous record over a considerable period of time. There are many types of such pens, some adapted to contain a thick gelatinous ink, some slightly viscous ink, and some an ink having all the properties of an ordinary liquid. It has been found that where a record is to continue for an extended interval, or where the chart is operated at a relatively high speed, or where the magnitude under measurement fluctuates to an extent that the total length of the line drawn by the pen upon the chart is relatively great, it is essential that a liquid ink be used. In the provision of a fountain pen for containing such an ink and supplying it to the chart in a manner to produce a clear line, there are encountered a number of problems, among which may be mentioned those of preventing abnormal loss of ink by evaporation, preventing spilling of the ink in case of sudden and extreme movements of the pen, and assuring a continued flow of ink to the nib or writing point without blotting, besides that of filling the pen without interfering with the record drawn on the chart.

It is an object of this invention to provide for recording instruments a pen which shall be free of splashing or spilling the contained ink in the event of rapid movements across the chart in response to changes in the measured magnitude.

It is a further object to provide a pen of the above nature which may be operated through a wide range of positions.

It is still a further object to provide a pen of the above nature which may readily be filled at any time without risk of defacing the record.

It is another object to provide a pen which shall possess the above advantages without material impairment of its ink-containing capacity.

In the drawing:

Fig. 1 is a perspective representation of a recording instrument to which a pen embodying the principles of the invention is especially adaptable.

Fig. 2 is a sectional view to an enlarged scale of a pen embodying the principles of the invention.

Fig. 3 is a top elevation of the pen shown in Fig. 2.

Referring now to the drawing, the numeral 10 in Fig. 1 represents a base plate upon which are operatively mounted the several elements constituting a recording instrument adapted to utilize advantageously a pen constructed according to the principles of the invention. Secured to the base plate 10 is a measuring element 11 adapted to perform a quantitative measurement upon any one of a variety of variable magnitudes such as pressure, temperature, flow, or electrical quantities, according to well-known principles, and to express said measurement by the deflection through a limited angle of a spindle 12 operatively connected to the active parts of the measuring element. Carried by the spindle 12 is an extended arm 13 adapted to be angularly deflected with the spindle 12, the extent of its angle of deflection being a measure of the variable magnitude determined by the element 11. Mounted upon the base 10 are bearing members 14 having journaled therebetween a cylindrical roller 15 adapted to be rotated at a constant speed by a clock or timing motor 16, and to drive an extended paper chart 17 in a sense to pass in juxtaposition to the arm 13. Carried upon the extremity of the arm 13 is a recording pen 18 embodying the principles of the invention, and adapted to mark upon the chart a continuous trace of its excursions thereover. The position of the pen 18 with respect to the edges of the chart 17 will be a measure of the magnitude determined by the element 11; and, since the chart 17 is continuously moved forward at a uniform rate by the clock 16, the trace left by the pen 18 upon the surface of the chart 17 will provide a graphic record of the magnitude under measurement.

The structure of the pen 18 will be understood by reference to Figs. 2 and 3. The body of the pen consists in a cylindrical cup 19, open at the top, secured to the arm 13 by soldering or otherwise, and having part way up its side an opening 20 communicating with a short tube 21 which projects beyond the arm 13, and terminates in a finely drawn nib or tip 22 formed of platinum, glass, or some other non-corrosive material suited to the purposes of recording. Placed within the cup portion 19 is a bent-up part 24, formed of strip metal having an extended side portion 25 lying close to the wall through which the opening 20 is pierced, and also having a doubled-over portion 26 lying within the top of the cup 19 and substantially level with the upper surface thereof. Secured within the bent-over portion 26 is a small pad or wad 27 of absorbent cotton, felt, or similar material. This pad 27 is relatively thin, and is definitely confined to the upper portion of the cup 19, leaving the lower portion entirely free to contain liquid ink.

It is well known that by completely filling the cup portion of such a pen with absorbent material the tendency to splash upon rapid deflection may be eliminated; but the absorbent properties of any filler which will accomplish this purpose are such as to retain a large proportion of the contained ink against the capillary action tending to feed said ink on to the record, so that the pen will operate a relatively short time on a single filling. Quantitative tests have shown that by completely filling a pen of this nature with absorbent material, the normal time of operating on a single filling of ink will be reduced to approximately $\frac{1}{10}$ of the time that the pen will operate if the filling is replaced by a pad as hereinbefore described. It is also a common practice to provide a metallic cover which may be slipped over the top of the cup-shaped portion of the pen to prevent splashing; but such a cover will not prevent spilling if the pen is allowed to lie for a considerable period of time at an angle far removed from its normal vertical position. Moreover, it is practically impossible to remove such a cap for purposes of filling the pen, or to replace it after doing so, without either interrupting or defacing the record on the chart. It has also been suggested that a metal cap be provided, having a small hole therein through which ink may be fed into the pen from a fine dropper; but this arrangement, while to some extent minimizing splashing on rapid and extreme deflections, will not prevent spilling if the pen is shifted a long way from its normal vertical position. With the use of the pad 27 located in the upper part of the cup, it has been found that the pen may readily be filled by dropping ink onto the pad from an ordinary medicine dropper or other form of filler, and that, not only does the pad effectively prevent splashing, but the pen may be continuously and effectively operated in a position which would result in the spilling of the contents of a pen having a solid metal cap. The extended side portion 25 is so conformed and disposed with respect to the interior wall of the cup 19 that capillary action between said portion and said wall will assure a constant supply of ink to the tube 21. The structure of the bent-up part 24 is made such that said part, together with the pad 27 may at any time be bodily removed from the pen for inspection or cleaning.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A recording pen comprising an open-topped cup member adapted to contain a supply of ink, means for distributing ink from said member to a record chart, a pad of absorbent material occupying only a part of the depth of said cup member, and means for retaining said pad in a position in the upper portion of said cup member.

2. A recording pen comprising an open-topped cup member adapted to contain a supply of ink, means for distributing ink from said member to a record chart, a pad of absorbent material occupying only a part of the depth of said cup member, and means within said cup member for retaining said pad in the upper portion of said cup member.

3. A recording pen comprising an open-topped cup member adapted to contain a supply of ink, means for distributing ink from said member to a record chart, a pad of absorbent material occupying only a part of the depth of said cup member, and means for retaining said pad in the upper portion of said cup, said retaining means comprising a bracket member having a lower portion fitted within the lower portion of the cup, a portion extending upwardly from said lower portion, and an upper portion comprising horizontally-extending elements for receiving said pad therebetween.

4. A recording pen comprising an open-topped cup member adapted to contain a supply of ink, said cup having an opening in a wall thereof and means extending outwardly from said opening for conveying ink to a record chart, a pad of absorbent material occupying only a part of the depth of said cup member, bracket means in said cup having an upper portion adapted to receive said pad, said bracket means also having a vertically-extending portion disposed in such relation to the wall of said cup as to provide for flow of ink to said opening by capillary action from points below said opening.

5. A recording pen comprising an open-topped cup member adapted to contain a supply of ink, means for distributing ink from said cup to a record chart, a pad of absorbent material occupying only a part of the depth of said cup, means providing for flow of ink by capillary action to said distributing means from points therebelow in said cup, and means for retaining said pad in position near the top of said cup.

6. A recording pen comprising an open-topped cup adapted to contain a supply of ink, means for distributing ink from said cup to said record chart, a pad of absorbent material occupying only a part of the depth of said cup, and means for retaining said pad in position near the top of said cup.

JOHN WINFRED BEECHER.